June 24, 1941. R. A. SMITH ET AL Re. 21,843

FLEXIBLE COUPLING

Original Filed Feb. 25, 1939 2 Sheets-Sheet 1

INVENTOR
ROBERT A. SMITH AND JOHN J. SERRELL, DECEASED, BY ROBERT A. SMITH, ASSIGNEE.
BY Brown + Jones
ATTORNEYS

FLEXIBLE COUPLING

Original Filed Feb. 25, 1939 2 Sheets-Sheet 2

INVENTOR
ROBERT A. SMITH AND JOHN J. SERRELL
DECEASED, BY ROBERT A. SMITH, ASSIGNEE.
BY
Brown & Jones
ATTORNEYS Reissued June 24, 1941

Re. 21,843

UNITED STATES PATENT OFFICE 21,843

FLEXIBLE COUPLING

Robert A. Smith, Mahwah, N. J., and John J. Serrell, deceased, late of Elizabeth, N. J., by Robert A. Smith, assignee Original No. 2,201,799, dated May 21, 1940, Serial No. 258,440, February 25, 1939. Application for reissue August 22, 1940, Serial No. 353,737

10 Claims. (Cl. 64—9)

Figure 3:
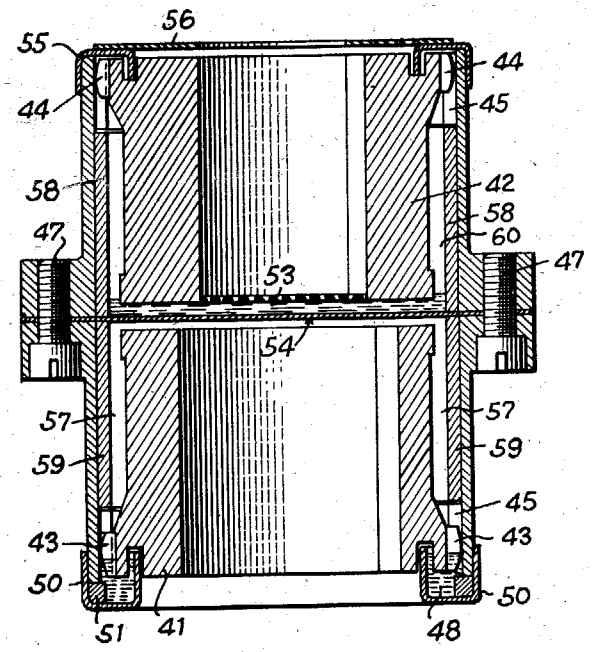

The invention relates to an improvement in flexible couplings for shafts and more particularly in flexible couplings of the gear type. In the usual arrangement of this type of flexible coupling the torque is transmntted from one shaft to the other by means of an external gear mounted on one shaft concentrically surrounded by and meshing with an internal gear mounted in or part of a casing in which the external gear is located. The torque of the external gear is transmitted by the internal gear to the casing and in turn to a second internal gear which meshes with an external gear mounted on the shaft to be turned, except in the construction known as a three bearing or shaft supporting type of coupling which is essentially one-half of the usual type of coupling. When the shaft ends carrying the external gears are closely adjacent, the internal gears are mounted in the ends of a cylindrical casing, frequently made of two half sections bolted together, which surrounds the two adjacent ends of the shafts and the external gears mounted on or operatively connected with them. In those situations where the shaft to be driven is located at a considerable spacing from the driving shaft, a third or intermediate shaft may be interposed between them. The ends of the intermediate shaft may be provided with external gears or internal gears and the adjacent ends of the driving and the driven shafts provided with the cooperating gear members. In other words, if external gears are carried by the ends of the intermediate shaft, then the internal gears are carried by the driving and driven shafts and vice versa. With this arrangement, each end of the intermediate shaft together with each adjacent end of the other shafts carries only one-half of the flexible coupling unit, that is to say, only one external and one internal gear. Hence, the casing section in which each internal gear is mounted surrounds only one external gear and the part of the shaft on which it is mounted.

But whether the two pairs of external-internal gears are located so closely together that the internal gears may be mounted in a single casing, which may be of two or more sections bolted together, or are located so far apart that the internal gears are mounted in separate casing sections, the mode of operation of the flexible coupling and of the pairs of gears is substantially similar, and the three bearing or shaft supporting type is essentially half of the complete coupling just described. Accordingly, for the sake of simplicity of description it will be assumed that the flexible coupling under consideration consists of two adjacent external gears cooperating with two internal gears mounted in the same casing which may be of two or more sections bolted together, it being understood that the features of the present invention are equally applicable to the arrangement in which the two external gears are spaced so far apart that they require the internal gears to be mounted in separate casings.

The casings carrying the internal gears are so constructed that they not only surround the external gears but also substantially enclose them at the hub end by means of plate-like rings or closure members which may be integral with or separable from the ends of the casing. One purpose of this construction is to provide an enclosed space for containing lubricant, such as oil, which will cover or at least be applied between the cooperating external and internal gear teeth during the rotation of the flexible coupling. When the shafts and the flexible coupling are not rotating the oil or other fluid lubricant settles into the lower part of the enclosing casing structure, whether it encloses only one or both of the external gears. When stationary the inwardly extending plate-like rings at the hub ends of the casing prevent the lubricant from leaking out of the casing up to the level of the lower edge of the central hole in the plate-like rings. When the coupling structure is rotating the lubricant is thrown by centrifugal force so as substantially to fill the space between the cooperating external and internal gear teeth.

The inner diameter of the internal gears is so close to the root diameter of the external gears, differing therefrom only by the sum of the clearances, that in order to simplify the definition of the invention in the description and in the claims, it is considered desirable to use words meaning in effect substantially the root diameter of the external gears rather than the inner diameter of the internal gears to identify this limit designation.

Flexible couplings of the gear type have frequently heretofore been so constructed that the space within the casing and close to the inner periphery thereof between the pairs of external and internal gears has been of such diameter and proportion that a considerable percentage of the available lubricant occupies this space while the flexible coupling structure is rotating, whereas at that time the gears should be thoroughly supplied with lubricant and it is desirable to direct over a long period of operation all the lubricant to the gears. There is thus present in gear-type flexible couplings of usual construction a quantity of lubricant for the gear teeth which is not directed or guided to the gear teeth when the coupling is rotating, hence is not available for efficiently submerging the cooperating gears to the last portion of the contained lubricant. When rotating a large part of the contained lubricant is undirected or misdirected, other than to the teeth needing it.

In the usual construction, if the cooperating external and internal gears are made smaller in diameter, this reduces the quantity of lubricant which may be contained in the casing when the structure is stationary, and it has been found that there will not be a desirably sufficient quanty of lubricant to be applied to the contacting teeth faces of the gears when they are operating. Various expedients have been resorted to in an effort to rectify this defect, but thus far, so far as we are informed, without satisfactory results, such as we have evolved. Our coupling now to be described, due to removable lubricant displacer rings guiding substantially all the oil to the gear teeth when rotating, can be much smaller in diameter, much lighter in weight, much less expensive to make for a given shaft size, and thereby our invention is most essential for lower cost and still gives comparable coupling shaft and power capacity.

Figure 1:
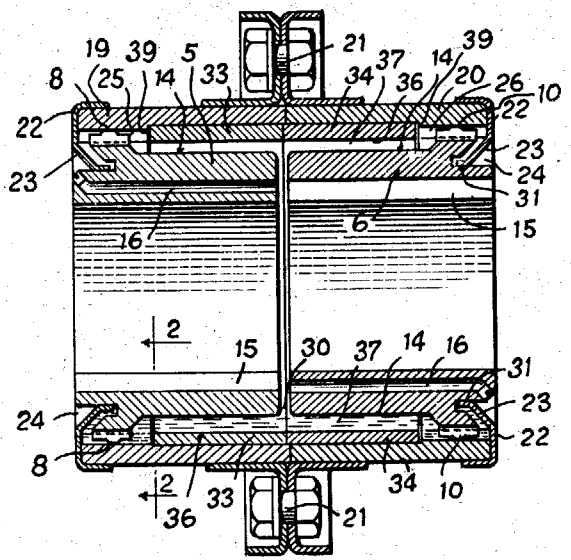
Figure 2:
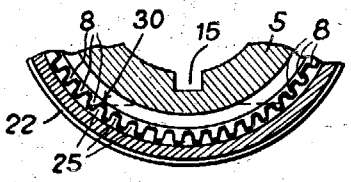
Figure 4:
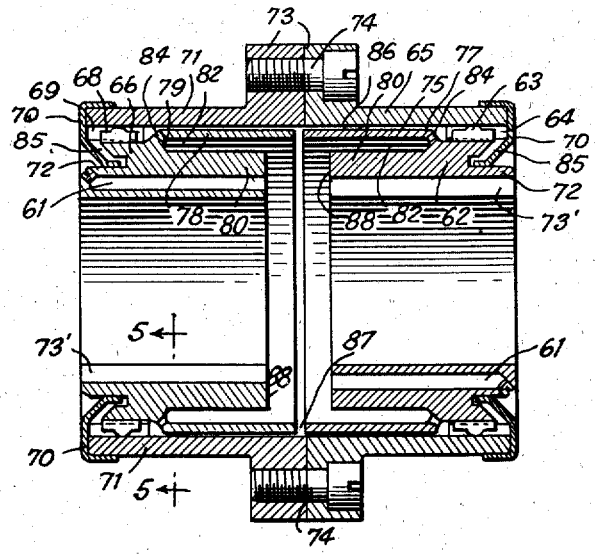
Figure 5:
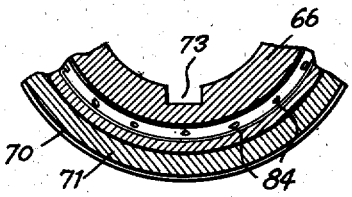
Figure 6:
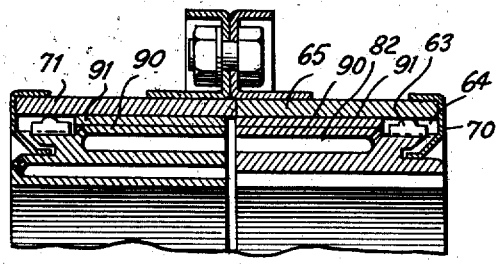
Figure 7:
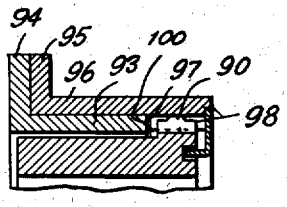

In the accompanying drawings illustrating the preferred form of the invention, Fig. 1 is a longitudinal vertical section through the improved flexible coupling for use in connecting shafts rotating on a substantially horizontal axis; Fig. 2 is a detail section taken on the line 2—2 of Fig. 1; Fig. 3 is a vertical section of the improved flexible coupling for shafts rotating on a substantially vertical axis; Fig. 4 is a view similar to Fig. 1 of a modified form of the invention; Fig. 5 is a detail section taken on the line 5—5 of Fig. 4; Fig. 6 is a view similar to the upper half of Fig. 1 and shows another modified form of the invention; and Fig. 7 is a fragmental longitudinal vertical section of a third modified form of the invention.

This improved gear type of flexible coupling, as illustrated in the drawings, comprises the two cylindrical hub members 5 and 6 adapted to be mounted on the adjacent ends of the shafts to be connected. The hub end of whole hub 5, that is, the end of the whole hub farthest from the end of the shaft on which it is mounted, is provided with an external gear 8; and similarly the hub end of the whole hub 6 is provided with an external gear 10. Each hub member may be provided with a keyway 15 and an oil duct 16.

The cylindrical casing for carrying the internal gears cooperating with the external gears on the hubs may consist of the two sections 19 and 20 fastened together as a unit by the bolts 21. The hub end of each section of the internal gear casing is provided with an annular dish-shaped closure member 22, and the inner end 23 of each closure member may project into a recess 24 in the hub end of the whole hub members 5 and 6. The closure members 22 may be inseparably connected with their respective internal-gear casing sections.

The outer end of the casing section 19 is provided with the internal gear 25 which surrounds and meshes with the external gear 8 on the hub 5, and the inner surface of the outer end of the casing section 20 is provided with the internal gear 26 which surrounds and meshes with the internal gear 10 on the hub 6.

In order that the cooperating external and internal gears at each end of the coupling structure may be properly lubricated during the rotation of the structure a supply of fluid lubricant is inserted through the ducts 16, and when the coupling structure is stationary, the lubricant supply can be filled in until it rises to the level indicated at 30 in Figs. 1 and 2, that is to say, slightly below the inner edge 31 of the plate-like rings forming the closure members 22. Such space is known hereinafter as the stationary lubricant space. In the improved flexible coupling structure of the present invention the greater proportion of the fluid lubricant is directed, when the coupling is rotating, into the spaces between and around the cooperating teeth of the external and internal gears by means of a lubricant deflector or lubricant displacer ring which, in the form of the invention shown in Fig. 1 is a cylindrical ring consisting of the two sections 33 and 34, which may fit snugly but slidingly within the casing and between the inner edges 39 of the internal gears 25 and 26. As shown, the inner surfaces or internal diameters 36 of the sleeve sections 33 and 34 are separated from the external surfaces 14 of the hubs 5 and 6 by a cylindrical space indicated at 37. When the coupling structure is stationary and the lubricant drains into the lower part of the space 37 and the adjacent regions around the teeth of the external and internal gears up to the level 30, termed as stated above, the stationary lubricant space, there is enough lubricant stored to amply submerge the cooperating gears when the coupling is rotating, and the lubricant within the casing is thrown by centrifugal action outwardly and around the teeth.

The internal teeth 25 and 26 on the casing sections 19 and 20 are somewhat longer axially than the external teeth 8 and 10 on the hubs 5 and 6, (and for the sake of clearness are shown exaggeratedly elongated) so that there may be the desirable axial movement between the intermeshing teeth. The inner edges of the internal teeth terminate at the positions indicated at 39 and the length of the sleeve sections 33 and 34 of the lubricant displacer ring is such that they take up substantially the whole of the distance from the shoulder 39 on the casing section 19 to the shoulder 39 on the casing section 20 and thereby insure that the external gears do not come closer together axially than that, in the case where the inner hub ends quite far apart. As a result of this arrangement of parts, the teeth of the internal gears 25 and 26 may be freely cut without interfering with the adjacent portions of the casing sections 19 and 20. The ends of the casing may be provided with the inseparable covers 22 and the stationary lubricant space within the casing will be such that sufficient lubricant will be contained therein to supply the necessary amount for the lubrication of the cooperating gear teeth because practically all of it is directed to the meshing gear teeth when rotating. It is to be noted that we enable substantially all the lubricant to be used on the teeth make a smaller and less expensive coupling possible, yet, when the coupling is to be taken apart the removal of the sleeve sections 33 and 34 of the lubricant displacer ring permits the hubs 5 and 6 to be slid off the ends of the shafts without requiring the closure members to be removed from the casing sections 19 and 20.

The form of the invention shown in Fig. 3 is essentially the same in principle as that shown in Figs. 1 and 2, except that since it is adapted for use in connecting vertically operating shafts separate lubricant containing compartments are provided for each adjacent shaft end. The hub section 41 is adapted to be mounted on the upper end of the lower shaft and the hub section 42 is adapted to be mounted on the lower end of the upper shaft. On the enlarged periphery of the lower hub member 41 is the external gear 43 and on the enlarged upper end of the upper hub member 42 is the external gear 44. These external gears cooperate with the internal gears 45 formed on the inner surfaces of the upper and lower ends of the casing 46, the two sections of which are connected by the bolts 47. The lubricant 48 for the gears 43—45 is contained in the dish-shaped annular member 50 which is provided with an annular gasket 51 to prevent leakage outwardly. The lubricant 53 for lubricating the cooperating gears 44—45 is held when the coupling structure is stationary, by the diaphragm 54. The joint between the upper cooperating external and internal gears 44—45 is closed by the dish-shaped annular member 55. A perforated plate 56 closes the upper end of the coupling structure.

The lubricant displacing or deflecting member of this form of the invention, is indicated by the cylindrical sections 58 and 59 and they occupy in the structure the same relative position that the sleeve sections 33 and 34 occupy in the form of the invention shown in Fig. 1. It will be understood of course that the quantity of lubricant 48 contained in the cap member 50 must not only be sufficient to cover the cooperating gear teeth 43—45 but also usually to permit a portion thereof to travel upwardly when rotating into the space 57 between the external surface of the hub 41 and the internal surface of the sleeve section 59. In like manner the quantity of lubricant 53 must be sufficient to travel upwardly when rotating through the space 60 between the outer surface of the hub member 42 and the inner surface of the sleeve member 58 to cover the cooperating gear teeth 44—45.

The modified form of flexible coupling shown in Fig. 4 comprises a hub 62 adapted to be mounted on one of a pair of shafts to be coupled, and provided with an external gear 63 which is surrounded by and meshes with the internal gear 64 carried by the inner surface of the outer end of the casing section 65; and a hub 66 adapted to be mounted on the other shaft and provided with the external gear 68 surrounded by and meshing with the internal gear 69 carried by the inner surface of the outer end of the casing section 71. The two casing sections are provided at their inner ends with the flanges 73 which are fastened together by the bolts 74. To the outer end of each casing section is secured an annular dish-shaped closure member 70 which closes the casing down to its corresponding hub end 72. Each hub is provided with a keyway 73 and an oil duct 61.

In this form of the invention the ring lubricant displacer is integral with each hub. The ring lubricant displacer 75 is connected with the hub 62 by a circular neck or web 77 and the ring lubricant displacer 78 is connected with the hub 66 by a circular neck or web 79. Between each ring lubricant displacer and the cylindrical portion 80 of each hub is a deep, axially extending circumferential groove 82 which serves as a lubricant container or reservoir. In order that the lubricant may be thrown by centrifugal force to the spaces adjacent the two pairs of cooperating external and internal gear teeth, the webs 77 and 79 are perforated at intervals with the holes 84. The capacity of the grooves 82 and the spaces 85 adjacent the gears is sufficient for lubricant enough and more to submerge the teeth when the flexible coupling is rotating. The peripheries of the ring displacers are separated from the inner cylindrical surfaces of the casing sections by only a slight clearance, indicated at 86, to permit misalinement of the shafts without frictional contact between the ring lubricant displacers and the inner surfaces of the casing. The inner extremities of the lubricant displacers 75 and 78 are spaced apart as indicated at 87 to permit slight axial movement of the shafts which may terminate as usual in similar structures flush with the ends 88 of the hubs 62 and 66. The ring lubricant displacers 75 and 78 function like the ring lubricant displacers 33 and 34 and are removable axially of the casing sections.

The modified form of flexible coupling shown in Fig. 6 is the same in its principal features as the coupling shown in Fig. 4, and the same elements thereof have the same reference numerals as in Fig. 4. The form of coupling shown in Fig. 6 differs from the coupling shown in Fig. 4 principally in the feature that there is interposed between each of the rings 90 which are similar to but smaller in external diameter than the lubricant displacers of Fig. 4, a lubricant displacer consisting of a ring of yieldable oil-proof rubber 91 which is tightly mounted on each ring 90, but is slightly smaller in external diameter than the internal diameter of the casing. The yieldable ring rubber lubricant displacers 91 function in the same manner as the lubricant displacers 75 and 78 of Fig. 4.

The flexible coupling shown in Fig. 7 embodies the principal features of the flexible coupling arrangement shown in Fig. 1. The ring lubricant displacer 93 of Fig. 7 differs from the ring lubricant displacer 34 of Fig. 1 in that its inner end is provided with a radially extending flange 94 which lies against the face of flange 95 of the casing section 96, so that when the two casing sections are bolted together the two sections of the ring lubricant displacer are bolted together and held firmly between them. It will be noted that in this form of the invention also the outer end 100 of the section 93 of the lubricant displacer terminates substantially flush with the inner end 97 of the internal gear 98 so as to prevent the external gear 99 from travelling inwardly beyond the outer end of the lubricant displacer.

What is claimed is:

1. In a flexible coupling for shafts, a hub mounted on each shaft, each hub being provided with external gear teeth, a casing surrounding said hubs and provided with internal gear teeth corresponding to and meshing with the external gear teeth, means attached to the casing for substantially closing the casing down to the hubs outside the two pairs of gear teeth, and a removable sleeve-form lining composed of a plurality of sections located within the casing and filling substantially all the space axially between the two pairs of gear teeth but not transmitting torque therebetween, the inner diameter of the sleeve being substantially equal to the root diameter of the external gears, defining at least in part, a stationary fluid-lubricant space, the greater portion of which is of smaller radius than the root radius of the external gear teeth, and serving to guide, when the coupling is rotating, substantially all the lubricant to the intermeshing gear teeth.

2. In a flexible coupling for shafts, a driving member and a driven member adapted to transmit torque, an external gear on at least one of said members, a casing surrounding the external gear and being provided with an internal gear meshing with the external gear so that torque is transmitted from one to the other, means permanently attached to the casing for substantially closing the casing to the gear-carrying member outside the gears, a removable lubricant-displacing ring located within the casing, the inner diameter of the ring being substantially the same as the root diameter of the external gear and the length of said ring being substantially the same as the length of the interior of the casing except for the space occupied by the internal gear, said inner diameter defining, at least in part, a stationary fluid lubricant-containing space the greater part of the radially outer surface of which is out of contact with said casing, said ring serving to direct substantially all the lubricant to the intermeshing gears when the coupling is rotating.

3. In a flexible coupling for shafts, a driving member and a driven member adapted to transmit torque, an external gear on at least one of said members, a casing surrounding the external gear and being provided with an internal gear meshing with the external gear so that torque is transmitted from one to the other, said gears being axially nearly of equal length except for one of said gears being axially longer than the other by normal, axial-movement clearance which is of smaller axial extent than the adjacent external gear teeth length, means attached to the casing for substantially closing the casing to the gear carrying member outside the gears, a removable lubricant-displacing ring located within the casing, defining, at least in part, a stationary fluid-lubricant-containing space the greater part of which is radially within the ring, said ring, when the coupling is rotating, serving to direct almost all the lubricant to those areas of the intermeshing gears which are in contact, except that lubricant which is directed to said axial clearance, said ring also serving to prevent the external gear from approaching closer to the other member than the adjacent end of the ring.

4. In a flexible coupling for shafts, a hub mounted on each shaft, each hub being provided with external gear teeth, a casing surrounding said hubs and provided with internal gear teeth corresponding to and meshing with the external gear teeth, means for substantially closing the casing to the hubs outside the two pairs of gear teeth, and a removable sleeve-form lining located within the casing and filling substantially all the space axially between the two pairs of gear teeth but not transmitting torque therebetween, said sleeve being of greater axial extent than either said internal teeth or said external teeth, the inner diameter of the sleeve being substantially equal to the root diameter of the external gears, defining, at least in part, a stationary fluid-lubricant space, a substantial portion of which is of smaller radius than the root radius of said external gear teeth, and serving to guide, when the coupling is rotating, substantially all the lubricant to the intermeshing gear teeth.

5. In a flexible coupling for shafts, a hub mounted on each shaft, each hub being provided with external gear teeth, a casing surrounding said hubs and provided with internal gear teeth corresponding to and meshing with the external gear teeth, the axial movement clearance between the internal gears and the external gears being in each case smaller than the external gear teeth length, means for substantially closing the casing to the hubs outside the two pairs of gear teeth, and a removable sleeve-form lining located within the casing and filling substantially all the space axially between the two pairs of gear teeth but not transmitting torque therebetween, the inner diameter of the sleeve being substantially equal to the root diameter of the external gears, defining, at least in part, a stationary fluid-lubricant space a substantial portion of which is of smaller radius than the root radius of the external gear teeth, and serving to guide when the coupling is rotating substantially all the lubricant to those areas of said gears which are substantially in contact with each other.

6. In a flexible coupling for shafts, a hub mounted on each shaft, each hub being provided with external gear teeth, a casing surrounding said hubs and provided with internal gear teeth corresponding to and meshing with the external gear teeth, said casing comprising a plurality of parts, and a removable lubricant-displacing ring located within the casing and positioned to assist in centering said parts of said casing with respect to each other so as to give said parts of said casing a common axis.

7. In a flexible coupling for shafts, a hub mounted on each shaft, each hub being provided with external gear teeth, a casing surrounding said hubs and provided with internal gear teeth corresponding to and meshing with the external gear teeth, said casing comprising two coaxial parts adapted to be juxtaposed endwise, and a removable lubricant-displacing ring located within the casing and positioned across the line of contact of said coaxial parts.

8. In a flexible coupling for shafts, a hub mounted on each shaft, each hub being provided with external gear teeth, a casing surrounding said hubs and provided with internal gear teeth corresponding to and meshing with the external gear teeth, said casing comprising two annuli, juxtaposed axially endwise, a removable lubricant-displacing annulus having an outer diameter substantially equal to the inner diameter of said two annuli and being positioned across the line of contact of said two annuli.

9. In a flexible coupling for shafts, a hub mounted on each shaft, each hub being provided with external gear teeth, a casing surrounding said hubs and provided with internal gear teeth corresponding to and meshing with the external gear teeth, means permanently attached to the casing for substantially closing the casing down to the hubs outside the two pairs of gear teeth, and a removable sleeve-form lining composed of a plurality of sections located within and against said casing, said casing comprising a plurality of parts endwise juxtaposed, said lining sections being endwise disposed and having a radial line of contact axially removed from a radial line of contact of said casing parts.

10. A gear type coupling comprising a pair of similar endwise-juxtaposed casing elements and an oil-displacing annulus within said casing for assisting in centering said elements with respect to each other to give said parts of said casing a common axis, said casing elements overlying substantially all of said annulus.

ROBERT A. SMITH.

*Pro se and as Assignee for John J. Serrell, Deceased.*